United States Patent [19]

Sterling

[11] 4,126,161
[45] Nov. 21, 1978

[54] TIRE INFLATION DEVICE

[76] Inventor: Raymond L. Sterling, 4528 Pleasant Ave. S., Minneapolis, Minn. 55409

[21] Appl. No.: 831,167

[22] Filed: Sep. 7, 1977

[51] Int. Cl.² .............................................. B65B 3/04
[52] U.S. Cl. ...................................... 141/95; 141/302
[58] Field of Search ...................... 141/94, 95, 96, 38, 141/67, 68, 197, 291–306, 346–362, 392; 137/213

[56] References Cited

U.S. PATENT DOCUMENTS 544,998  8/1895  Smith .................................... 141/95

Primary Examiner—Houston S. Bell, Jr.
Attorney, Agent, or Firm—James R. Cwayna

[57] ABSTRACT

A pressure control and regulating device for the proper filling of pneumatic tires and the like which device includes a filling stem receiving end for removeably attaching the same to a tire during filling and a pressure line receiving end to which the source of air pressure is attached with a pressure release, spring calibrated mechanism arranged between such ends which spring will open the unit for release of pressure to atmosphere upon the pressure reaching a predetermined level, the release directing the air from the unit past a whistle producing passage for the production of a constant pitch sound.

9 Claims, 9 Drawing Figures

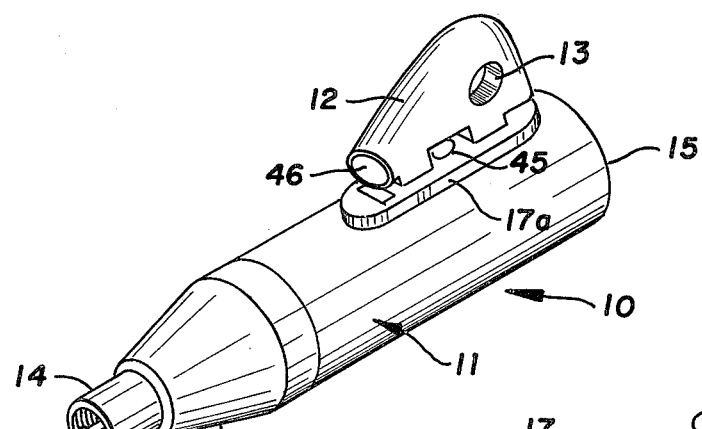
FIG.1
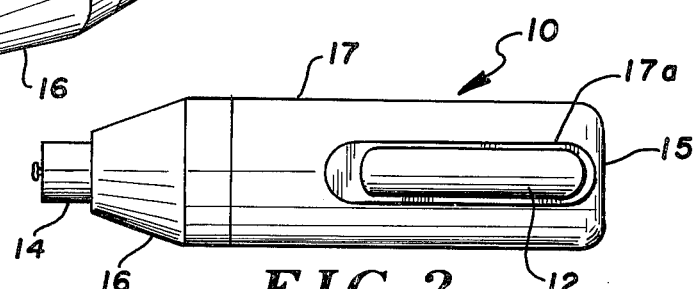
FIG.2
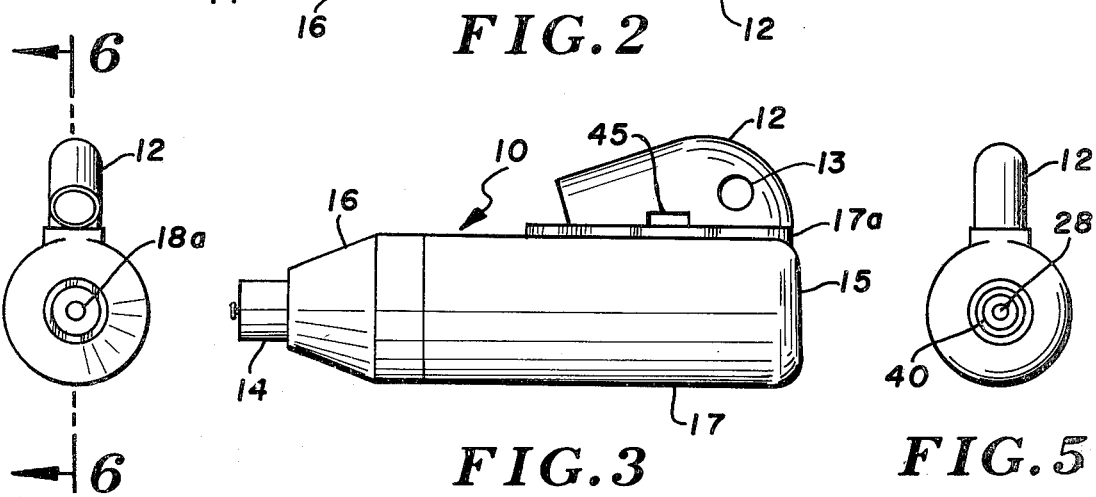
FIG.3
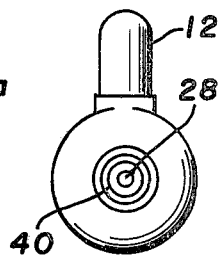
FIG.5
FIG.4
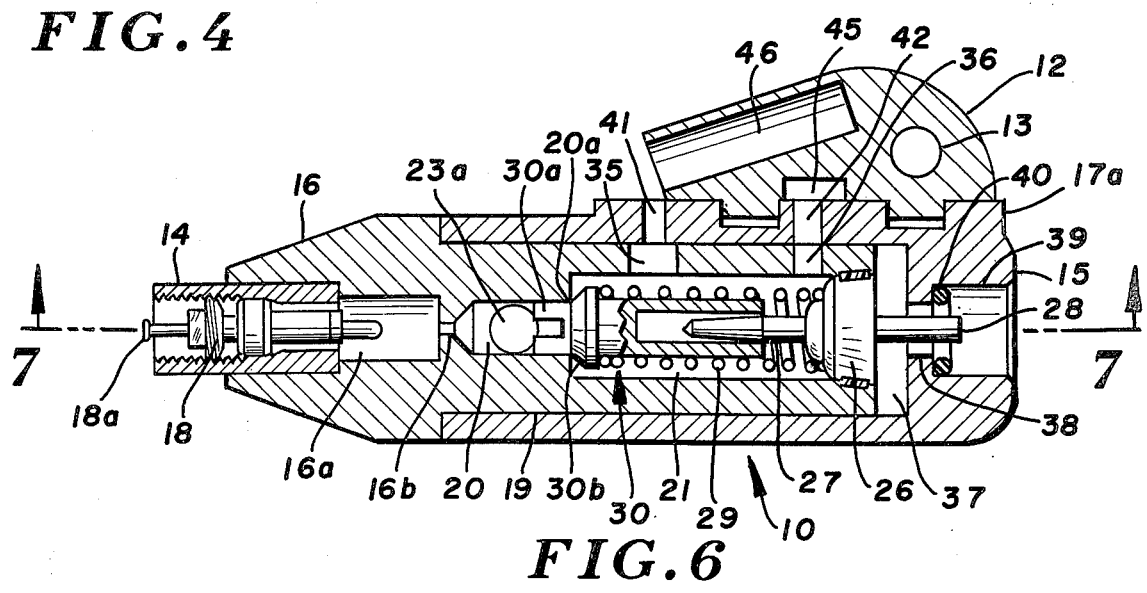
FIG.6

TIRE INFLATION DEVICE

FIELD OF THE INVENTION

This invention relates generally to mechanisms for the filling of pneumatic tires and the like and which provides for a preset release when the air pressure being delivered to the tire and the pressure within the tire reaches a predetermined level the released air being directed past a whistle or other noise producing passage such that the user is alerted to proper pressure levels by the noise produced.

BACKGROUND AND OBJECTS OF THE INVENTION

The device disclosed herein is an improvement upon the device described and claimed in my prior filed and currently active application for United States Letters Patent, Ser. No. 762,582, Filed 01/26/77 and entitled Tire Inflation Device. The device disclosed herein includes a whistle or noise producing element which will indicate to the user when the proper, preset pressure has been delivered to the unit being provided with air.

The prior art, to the best of applicant's knowledge includes devices which are normally mounted on the article to be filled and remain thereon during usage of the article and the alarm or alerting device, which includes such whistles or other noise producing apparatus are actuated as a result of a drop in the air pressure of the unit to indicate that refilling or other attention is required for the tire or the like.

With applicant's device, the unit is preset to insure that the article to be filled is filled to such pressure and thereafter, the back pressure created by any further filling results in an audible signal. In actual usage, additional filling is prevented by the release of air from the unit and this release is the triggering element for the audible signal. The device further provides and additional relief or release mechanism which diverts a portion of the relief air from the audible signalling portion of the unit for, as is well known, should be velocity and volume of air be excessive, the whistle would be inaudible.

It is therefore an object of the applicant's invention to provide an inflation regulator for the inflation of pneumatic tires or the like which will insure the proper filling of the same to a predetermined pressure and will prevent overinflation and will provide an audible signal upon reaching such pressure.

It is a further object of applicant's invention to provide an inflation regulator for pneumatic tires and the like which is easily attachable and removeable from the tire being filled and which will prevent overinflation of the tire by providing a preset pressure indicator device in assoication therewith.

It is still a further object of applicant's invention to provide an inflation regulator for pneumatic tires and the like which will meter the air being delivered to the tire to prevent damage thereto by the delivery of air from a source of extreme pressure.

It is still a further object of applicant's invention to provide an inflation regulator for the inflation of pneumatic tires and the like which regulator includes an audible signalling device to signal when the proper pressure has been attached and which provides a relief mechanism in association with the audible portion of the device such that the audible signal will be readily available independent upon the continued exposure of the device to the source of pressure.

These and other objects and advantages of applicant's invention will more fully appear from the accompanying disclosure made in connection with the enclosed drawings in which the same numeral is utilized to identify the same or similar parts throughout the several views, and in which:

FIG. 1 is a perspective view of an inflation device for pneumatic tires and the like incorporating the concepts of applicant's invention;

FIG. 2 is a top plan view thereof;

FIG. 3 is a side elevation thereof;

FIG. 4 is an end view thereof taken from the source connective end;

FIG. 5 is an end view thereof taken from the tire connective end;

FIg. 6 is a longitudinal section taken substantially along line 6—6 of FIG. 4;

Figure 7:
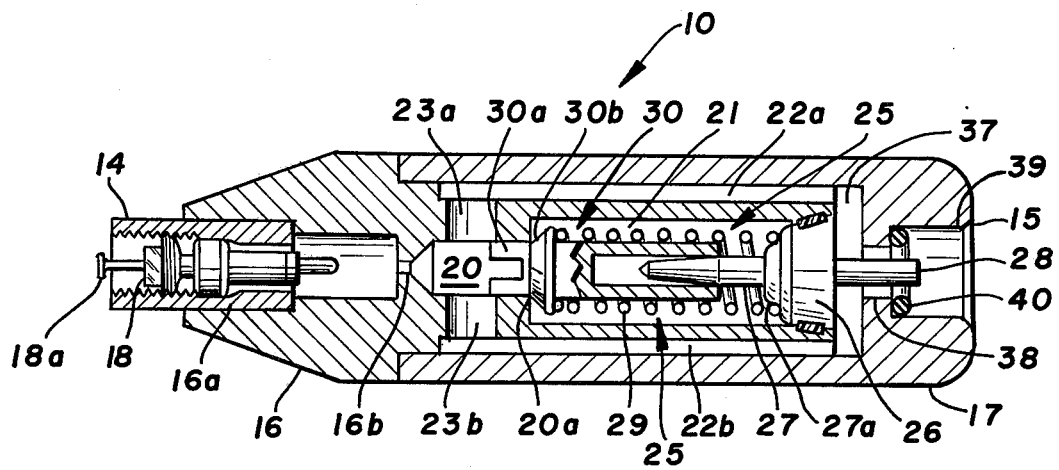
FIG. 7 is a longitudinal section taken substantially along line 7—7 of FIG. 6 and being taken at a location displaced ninety degrees from the view of FIG. 6.

In accordance with the accompanying drawings, the inflator device embodying the concepts of applicant's invention is generally designated 10 and basically includes a main body portion 11 and an audible signal producing portion 12 mounted on the cylindrical exterior surface thereof. The signal producing portion 12 may include, in the form shown, an aperture therethrough 13 such that the same may be easily carried on a chain or holder.

The main body portion 11 provides a longitudinally extending housing member having an inlet end 14 and an outlet end 15. The use of the device provides that the inlet end 14 will be removeably attached to an air source and the outlet end 15 will be removeably attached to the article to be filled with air. For these uses, the inlet end 14 provides a male fitting and the outlet end 15 provides a female fitting. This arrangement allows the normally supplied fitting from an air hose to be fitted to the male 14 end of the device 10 to be placed onto the stem of the penumatic tire or article to be filled.

The main body 11 includes a two piece construction positively joined together and comprises a head portion 16 and a housing portion 17. The head portion 16 is, in the form shown, tapered to the inlet end 14 and provides a passage therethrough which passage 16a is provided with an enlarged portion to receive the inlet valve 18 therein with a metering passage 16b in alignment with valve 18 to meter the flow of air introduced into the device. This metering concept is essential as many source of air pressure would deliver a volume of air that may be harmful to the article being inflated. This metering orifice will reduce the flow to a level that will not result in damage to the article being filled.

The valve 18 is received into the enlarged end of passage 16a and this valve may comprise what is known as a "Schrader" valve which is a simple, spring loaded valve which will allow air to flow therethrough only upon a depression of actuating element 18a thereof.

Figure 8:
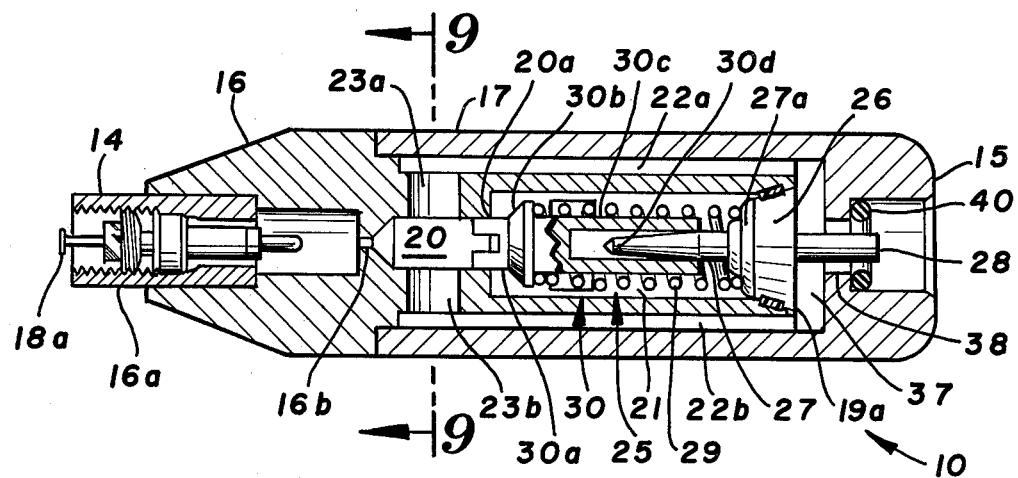
FIG. 8 is a view similar to FIG. 7 and illustrating the controlling, internal apparatus of the device in a second, relief position; and, FIG. 9 is a transverse section taken substantially along line 9—9 of FIG. 8.
Figure 9:
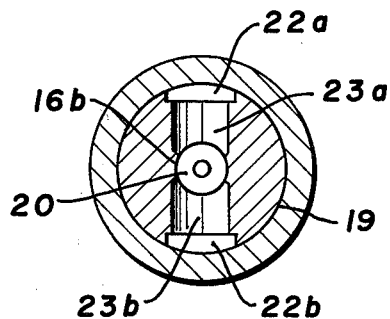

The head portion 16 extends longitudinally from the metering passage 16b at a reduced diameter, as particularly illustrated in FIG. 6, designated 19 and this extending section 19 is provided with a continuing internal, longitudinal passage 20 of a first reduced size and a second enlarged sized portion 21 such that a closure, radially extending portion 20a is provided at the juncture of such passage portions and the exterior of such extending section 19 is provided with a pair of diametrically opposed, longitudinally extending slots about the periphery thereof, designated 22a, 22b and illustrated in FIGS. 7, 8 and 9, which slots 22a, 22b are connected to the reduced longitudinal passage 20 by radially extending passages 23a, 23b.

From this passage description, it should be obvious that several paths of air flow are provided. Air entering through the inlet end 14 and the inlet valve 18 passes through the metering orifice 16b and into the reduced passage portion 20. From this passage 20, air is normally free to flow outwardly through the passages 23a, 23b and thereafter down the longitudinal slots 22a, 22b to the outlet end 19a of the longitudinally extending portion 19 or alternatively, under controlled situations, the air would be allowed to flow into the enlarged passage portion 21, past the control or valving shoulder 20a.

To allow the air flow into passage 21, a valving structure is maintained within the passage 21 and this structure is designated 25. The entire valving unit 25 is maintained within the enlarged passage portion 21 and, in the form shown, includes a stationary passage closure portion 26 positively sealed into the extending passage 21 to seal the same and this portion is provided with an inwardly directed guide portion 27 extending into the passage portion 21 and an outwardly directed actuation portion or shaft 28 which extends into the outlet end 15 of the unit.

The inwardly extending shaft portion 27 is provided with a first radial locating shoulder 27a for the orientation of a spring or biasing member thereabout, said spring being labelled 29, which spring is provided to normally force a control member 30 forwardly against the control shoulder 20a. The control member 30 includes a first cylindrical end 30a receiveable and movable within passage 20 with selected portions of such end 30a being ported to allow air to flow into passage 21 when there is a predetermined amount of longitudinal shifting of the control member 30 against the biasing member 29 and this unit further includes a tapered sealing shoulder 30b directly behind such cylindrical portion 30a which is brought into sealing relation with shoulder 20a for sealing thereagainst. Rearwardly of the tapered surface 30b is a longitudinally extending portion 30c having an internal, closed end into which the guide member 27 is received for movement thereon and the biasing member controls the movement of such control member 30 to control flow either into the passage 21 or outwardly from the passage 20 by controlling the movement of the control member 30 in response to pressure within the passage 20.

A pair of outlets 35, 36 are provided to extend radially outwardly from the passage 21 such that air that may enter therein upon the control member 30 being forced from sealing position against shoulder 20a will ultimately be expelled from the device 10 as will be explained in a description of the main body 11 and the audible section 12. It should be noted that these passages 35, 36 must be displaced from the longitudinal slots 22a, 22b which extend along the extending portion 19 and, in the form shown, these passages 35, 36 are displaced from such slots at 90°.

The housing portion 17 consists of a longitudinally extending housing providing an interior passage 37 of the same internal diameter as the internal extending section 19 for a sealed fit therewith. As illustrated in FIGS. 6, 7 and 8, the length of such passage 37 is greater than the length of the member 19 to define an outlet chamber adjacent the outlet end 15 of the device 10. As illustrated in these figures, a passage 38 is provided through the closed end of such member 17 through which actuation portion 28 of the valving structure 25 extends. This passage permits extension of such actuation portion 28 into an enlarged, stem receiving passage 39 designed to receive the stem of an article to be filled and a sealing member such as washer 40 is arranged therein to seal against the stem. Placement of the device upon a tire stem or the like will depress the normally supplied air valve of the tire and will allow air to be delivered thereto or therefrom.

The housing portion 17 also includes a pair of radially extending passages 41, 42 which are arranged to be in alignment with the passages 35, 36 for the passage of air therethrough from the flow passage 21.

The audible device 12, is rigidly attached to the periphery of the housing 17 and in the form shown is generally triangular in shape and is mounted on a longitudinal boss 17a. A laterally extending groove 45 is provided through the device 12 and is in communication with passage 42. The audible creating portion of device 12 is provided through a closed end passage 46 arranged adjacent to the passage 41 such that the air flowing from passage 41 will create a whistling effect as it passes passage 46. It is also known that if too great a flow of air or the flow of air should be too rapid past the whistle passage 46 the audible effect will not result and therefore the passages 36, 42 and groove 45 combination serves as a relief for such air such that upon reaching a constant discharge through the sets of passages, the whistle will become constant and audible at a constant level. This device then gives the user a proper indicia as to the filling of and the obtaining of the proper pressure within the article to be filled. When the audible whistle is constant the user will know that the article is properly filled but he will likewise be informed as to the article obtaining or reaching the proper filling pressure as the increasing pressure in the article will result in a moving load being placed on the biasing member and it will move rearwardly until the desired pressure is obtained, at which time the air flow will be entirely through the passages 35, 41 and 36, 42.

It should be obvious that modification of the biasing member will result in a control of the pressure delievered to the article to be filled. The movement of the spring or biasing member in response to pressure against the end 30a of the control member 30 is determined by the pressure being developed in the article as such pressure is transmitted to the passage 20.

It should also be obvious that applicant provides a unit which is relatively compact in that it is provided in a basic longitudinal configuration. This is a definite advantage over those devices that have a radially extending spring loading configuration.

The use of the article should be obvious to anyone that has attempted to fill an article from an air hose or other source of high pressure. The device is simply placed upon the stem or other inlet of the article and the source of supply is placed against the inlet end of the device. When the article has been filled to the pressure as permitted by the biasing member, the audible signal will become clear and constant. The flow of air to the article, particularly when considering tires of small volume such as bicycle tires is controlled by the metering orifice and the final pressure delivered to the article is determined by the spring or biasing pressure. It is important to note that the device embodying this concept will be set, by providing a proper spring, to a certain, limited range of pressures and may be precisely set to an exact pressure, the final results including the proper filling and the audibility being the same.

What I claim is:

1. A regulator device for the inflation of pneumatic tires and the like from an independent pressure source, such device including:
   a. a body member having an inlet end and an outlet end, said inlet end being arranged to be connected to a source of air under pressure, said outlet end being arranged to be connected to an article to be filled with air;
   b. a first passage formed longitudinally, interiorally of said body member for communication of air from said inlet to said outlet end;
   c. a second passage communicating with said inlet end and arranged to discharge air under pressure from said body member;
   d. a valving member arranged in said second passage and controlling the flow of air therethrough;
   e. audible signal producing means arranged to receive air being discharged from said body member; and
   f. biasing means arranged and constructed to control said valving member, said biasing member normally holding said valving member in closed position and opening in response to the pressure within the article to be filled to prevent overinflation thereof.

2. The structure set forth in claim 1 and said first and second passages being arranged in generally longitudinally extending relation within said body member and being generally parallel to each other.

3. The structure set forth in claim 1 and said inlet end being provided with a valving member.

4. The structure set forth in claim 1 and said outlet end being provided with an actuating, longitudinally extending member for engagement with and opening of a valve member of the article to be filled.

5. The structure set forth in claim 1 and a metering orifice being arranged between said inlet end and said first and second passage for the metering of air flowing from said inlet to said passages.

6. The structure set forth in claim 1 and said second passage being longitudinally arranged interiorally of said body member and having at least one radially extending portion thereof for exit through said body member.

7. The structure set forth in claim 6 and said audible signal producing means being arranged in signal producing relation to said radially extending portion of said second passage whereby an audible signal is produced as air exits from said passage.

8. The structure set forth in claim 7 and said signal producing means including a closed end passage arranged to have the exiting air pass over the open end thereof whereby a signal is produced.

9. The structure set forth in claim 6 and a second, radially extending portion provided in communication with said second passage for the relief of air through said body member.

* * * * *